United States Patent [19]
Gahan et al.

[11] Patent Number: 5,600,814
[45] Date of Patent: Feb. 4, 1997

[54] DATA PROCESSING UNIT FOR TRANSFERRING DATA BETWEEN DEVICES SUPPORTING DIFFERENT WORD LENGTH

[75] Inventors: Richard A. Gahan, County Galway; Eugene O'Neill, Galway, both of Ireland

[73] Assignee: Digital Equipment Corporation, Maynard, Mass.

[21] Appl. No.: 421,509

[22] Filed: Apr. 26, 1995

Related U.S. Application Data

[63] Continuation of Ser. No. 130,327, Oct. 1, 1993, abandoned.

[30] Foreign Application Priority Data

Nov. 12, 1992 [IE] Ireland ................... 922813

[51] Int. Cl.$^6$ ............................................. G06F 13/10
[52] U.S. Cl. ................... 395/427; 395/411; 395/421.01; 395/421.02; 395/421.1; 395/307; 364/DIG. 1; 364/229.1; 364/238.6; 364/254.1; 364/254.8
[58] Field of Search .................... 395/431, 439, 395/411, 375, 307, 421.01, 421.02, 421.1, 427

[56] References Cited

U.S. PATENT DOCUMENTS

| | | | |
|---|---|---|---|
| 4,716,527 | 12/1987 | Graciotti | 395/500 |
| 4,831,514 | 5/1989 | Turlakov et al. | 395/500 |
| 4,878,166 | 10/1989 | Johnson et al. | 395/307 |
| 5,280,598 | 1/1994 | Osaki et al. | 395/307 |
| 5,303,353 | 4/1994 | Matsumura et al. | 395/307 |
| 5,357,622 | 10/1994 | Parks et al. | 395/444 |
| 5,394,528 | 2/1995 | Kobayashi et al. | 395/307 |

OTHER PUBLICATIONS

Dictionary of Computers, Information Processing & Telecommunications 2nd Edition, Jerry M. Rosenberg, John Wiley & Sons, New York 1984.

*Primary Examiner*—Eddie P. Chan
*Assistant Examiner*—Hiep T. Nguyen
*Attorney, Agent, or Firm*—Kenneth F. Kozik

[57] ABSTRACT

A data processing system comprising a main memory 10 with a 32-bit longword data bus 11 and an address bus 12, and a link unit 20 using 16-bit shortwords. The link unit has two shortword memories 26 and 28 for descriptor and message shortwords. Descriptor shortwords are exchange individually with the memory 10, residing in the lower halves of longword locations; message shortwords are exchanged with the memory 10 through a concatenation and deconcatenation unit 40 so that they are stored in pairs in longword locations. Unit 20 passes descriptor addresses (with top bit 1) from a register 25 and message addresses (with top bit 0) from a register 27 to the main memory through address processing means 36, which comprises a multiplexer 43 with its two data inputs fed with two versions of the address with a 1-bit shift between them. The top address bit controls the multiplexer, so that the main memory address steps by 1 for every step of a descriptor address or every second step of a message word address.

1 Claim, 2 Drawing Sheets

DATA PROCESSING UNIT FOR TRANSFERRING DATA BETWEEN DEVICES SUPPORTING DIFFERENT WORD LENGTH

This application is a continuation of application Ser. No. 08/130,327, filed Oct. 1, 1993, now abandoned.

FIELD OF THE INVENTION

The present invention relates to data storage in a digital data processing system, and more specifically to data storage in a system comprising a plurality of subsystems having different word lengths.

BACKGROUND OF THE INVENTION

Such a system will often consist of a central or main subsystem with the other subsystems coupled to it somewhat analogously to a peripheral subsystem. The main subsystem (or simply "system") will be designed to deal with most of the system workload, and will therefore normally have a longword length; it will also include a main (or system) memory. The subsystem will be designed primarily to deal with some specialised function, such as a communication link, which involves a shorter word length than the main system.

Such a system design, with the main system and the subsystem having different word lengths, may be optimal, in that designing the subsystem with a word length matching the main system would clearly be inefficient. Such system design may also result from upgrading existing system designs, since it may be better to adapt a well-established subsystem design than to generate a completely new design. (Compatibility of the new design with existing systems may also be important).

In such a system, communication between the subsystem and the main system will often be primarily through the main memory, which being intended to operate as effectively a part of the main system will have a long word length. We can take it that the subsystem word length is an exact fraction of the full word length. A 1:2 ratio (e.g. 16 and 32 bits) will be the most common, and we will for convenience assume that this is the case, though a ratio such as 1:4 is possible. (We shall use the terms "longword" and "shortword" for the two word lengths).

A basic requirement which any such system has to satisfy is for the main system and the subsystem both to be able to access the main memory (or at least a substantial part of it), and thereby share information (i.e. pass information between themselves). There are difficulties if, as is often the case, the main system is organised or operated in such a way that main memory accesses must be by full longwords.

A simple technique is for both the main system and the subsystem to address the memory in the same way, i.e. using the same addresses. A main system access to the memory will operate on the full longword length; a subsystem access will operate on only half (normally the lower half) of the longword, with the upper half being discarded on reading and being forced to 0 on writing. This technique is known as "striping". The memory space is striped, with stripes of two different colours alternating through the memory; the stripes of one colour are used differently to the stripes of the other colour. In this instance, only the stripes of one colour are used by the subsystem.

The disadvantage of this simple technique of striping is that memory space is used inefficiently. If the subsytem uses a large amount of memory, then half the memory capacity is unused.

The memory may include a controller (typically a DMA controller) which allows block writing. With this, a block of words can be sent together with the address of the first word, and the controller automatically increments the address for the following words of the block. If, as will usually be the case, the block size is limited (it is normally fixed) and the data to be written into the main memory consists of several blocks, the result is that the memory is striped as before; the only difference is that the stripes are wider.

An alternative technique is packing and unpacking. The subsystem is coupled to the main memory through a packing/unpacking unit, which packs shortwords in pairs from the subsystem for storage as longwords in the main memory, and unpacks the longwords into pairs of shortwords for use by the subsystem.

The main disadvantage of this technique of packing and unpacking is with the writing of single shortwords into the main memory. Only longwords can be written into main memory, and the writing of a word destroys whatever was previously in the location into which the new word is being written. Hence to write a shortword into half of a longword location in memory without destroying the contents of the other shortword half of the longword location, the longword has to be read out, the new shortword has to be written into the appropriate half of this longword (while the other half is preserved), and the modified longword has to be written back into memory.

This procedure is clearly highly inefficient. While it may be tolerable in certain special circumstances, it more than doubles the access time for shortword writes.

SUMMARY OF THE INVENTION

The general object of the present invention is to provide an improved system for a subsystem using shortwords to communicate with a main memory using longwords.

Accordingly the present invention provides a data processing unit coupled to a data bus, the unit includes shortword memory for shortwords, the data bus width being a longword which is a multiple of the shortword length, a bus for passing shortwords between the memory and the data bus individually, registers for concatenating and deconcatenating shortwords passing between the shortword memory and the data bus to match the longword length, address storage, and address processing for passing addresses therefrom to an address bus, the address processing including a multiplexer with its two data inputs fed from the address storage with a relative offset and controlled by a bit from the address storage.

BRIEF DESCRIPTION OF THE DRAWINGS

A digital data storage system embodying the invention will now be described, by way of example, with reference to the drawings, in which.

DESCRIPTION OF THE PREFERRED EMBODIMENT

Figure 1:
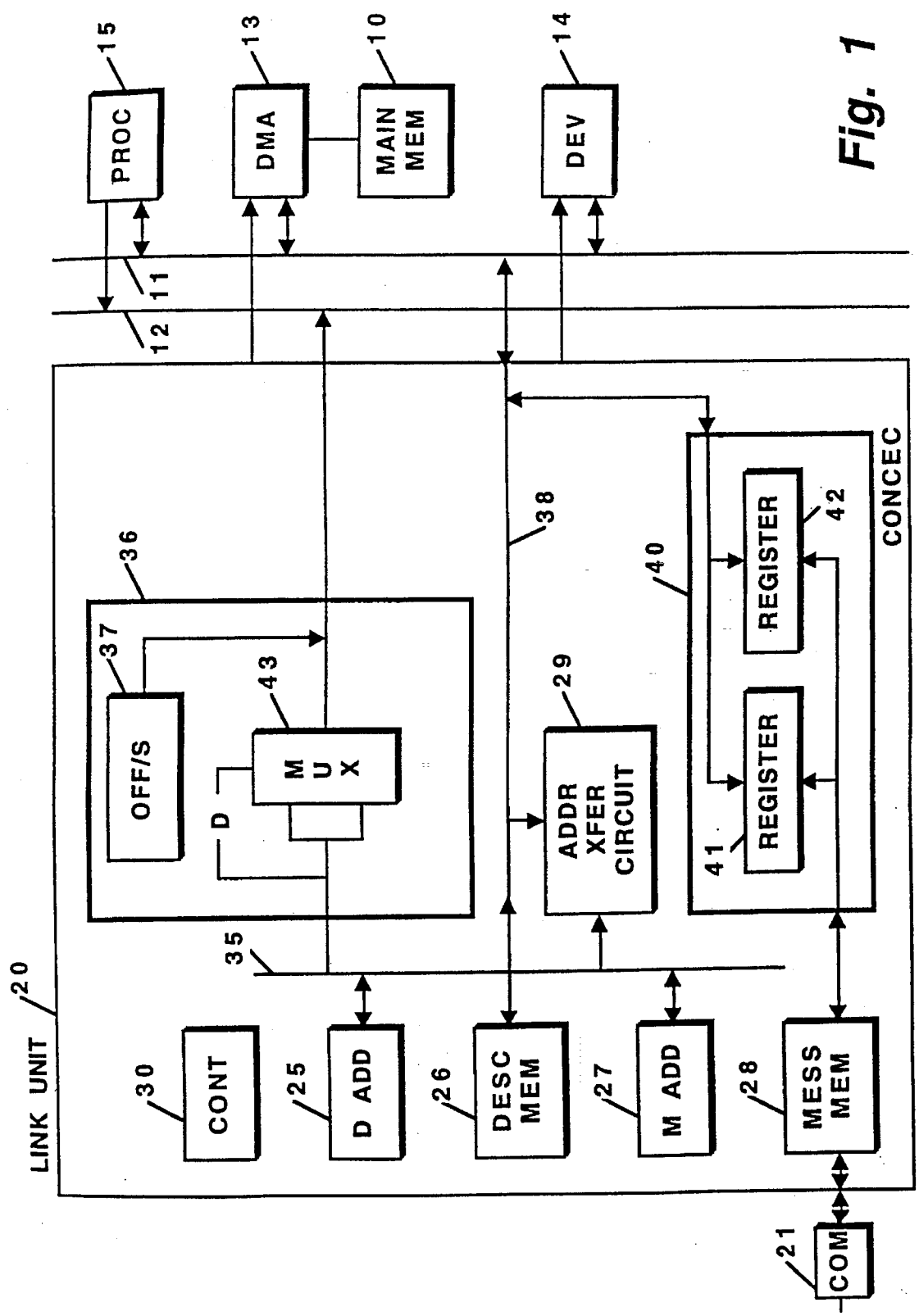
FIG. 1 is a block diagram of the system in conceptual form.
Figure 2:
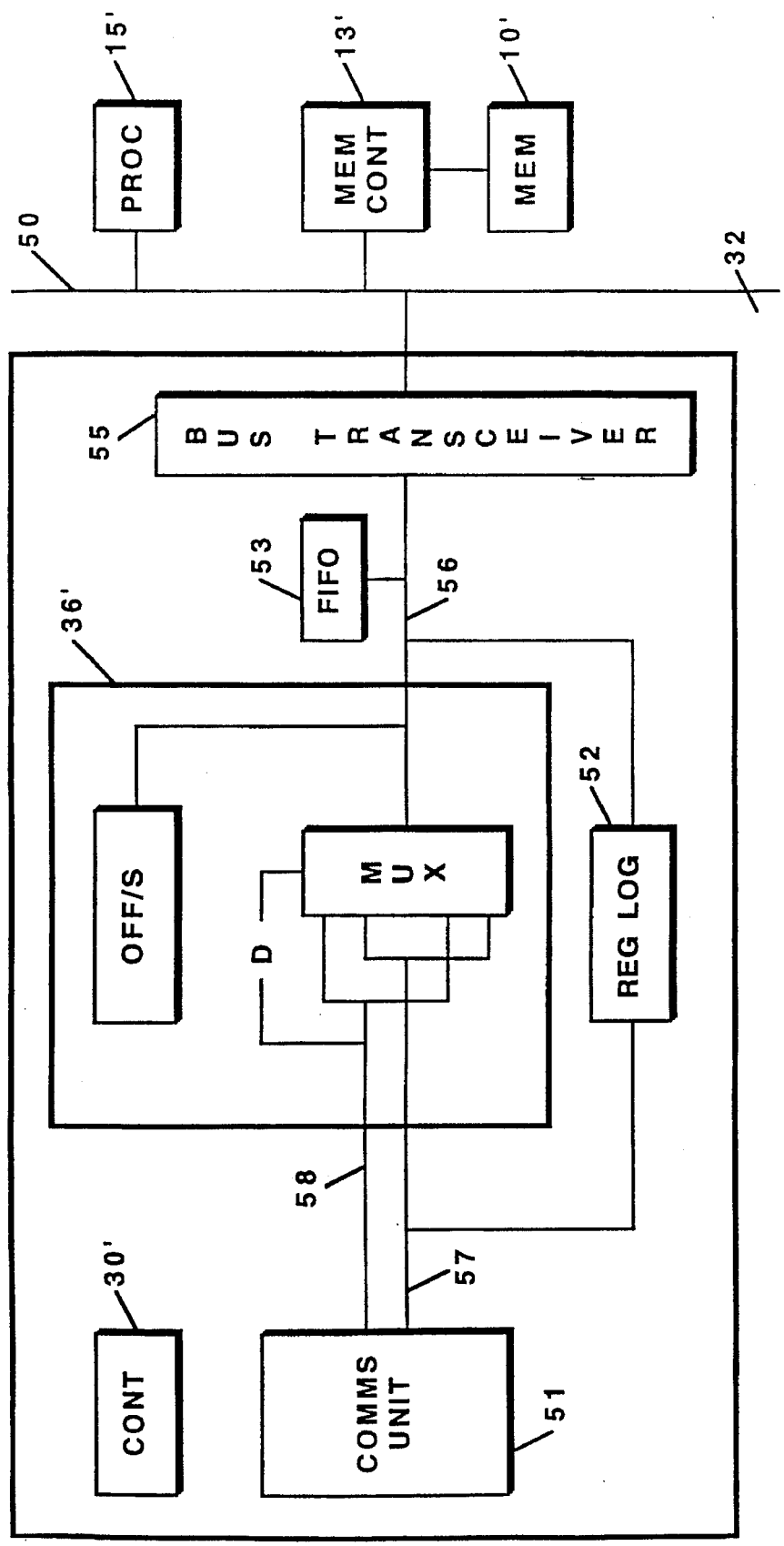
FIG. 2 is a block diagram of a practical implementation of the system.

FIG. 1 shows the functional organisation of the system in conceptual or abstract form, with the different functions being shown in the form of blocks or units as if they were hardware, while FIG. 2 shows the actual hardware of the preferred embodiment. Thus several different blocks of FIG. 1 may correspond to single block of FIG. 2.

Referring to FIG. 1, the system comprises a main memory 10 coupled to a data bus 11 and an address bus 12 via a memory control unit (DMA unit) 13. The memory 10 stores 32-bit longwords and the data bus 11 is correspondingly a longword (32 bits) wide. The addresses on the address bus 12 are the addresses of the longwords in the memory 10.

The buses 11 and 12 have a variety of devices such as a device 14, a processor 15, etc. coupled to them; in general these devices are longword oriented (i.e. they operate on longwords and longword addresses).

In addition to the longword-oriented devices, there is a further device 20, coupled to the buses 11 and 12, which is organised primarily to operate with 16-bit shortwords. This device 20 is a communications link unit, concerned primarily with messages being transmitted between the memory 10 and the communication device 21. Messages being received by the system will be passed from the link unit 20 to the memory 10; some other device (for example processor 15) will then extract and process them. Messages being transmitted by the system will be taken from the memory 10 by the link unit 20; the processor 15 will have previously constructed those messages and placed them in the memory 10.

The memory 10 has buffers defined in it for the messages. The location and size of each of these buffers is determined by a buffer descriptor, which defines the address and size of the buffer, together with certain other control information about its contents. The buffer descriptors are initially constructed and entered into the memory 10 by the processor 15.

The buffer descriptors may be taken as stored in fixed locations in the memory 10, so that both the processor 15 and the link unit 20 can interrogate them to discover information about the buffers and their contents and can write to them to update that information. The link unit 20 can be initialized with an initialization block which includes the location of the buffer descriptors.

At the start of message reception, the link unit 20 will access the descriptor of the next unused buffer, extract the buffer address, and write the incoming message into the buffer. When the message has been received, the link unit 20 will update the buffer descriptor with the message length. If the message overflows the buffer, the link unit 20 will access the descriptor of the next following unused buffer and use that buffer to store the "overflow" part of the message, and so on.

Control of the buffers can be achieved by providing an ownership bit in each descriptor, the state of which indicates whether the link unit 20 has filled the buffer so that it is now ready for processing by the processor 15, or the processor 15 has processed the buffer so that it is now effectively empty and ready for use by the link unit 20.

The buffers can be organised in various ways, e.g. as a pool, a linked list, or rings, and their sizes may be fixed or variable. These details are not relevant to present purposes; we shall merely assume that the link unit 20 has some means for finding the next buffer to be used.

Message transmission follows the same pattern, except that the flow of information is from the memory 10 to the link unit 20. The link unit 20 inspects the next buffer descriptor and extracts, from the associated buffer, the information to be transmitted (and, if the buffer descriptor indicates that the message continues beyond that buffer, continuing on to the next buffer).

Internally, the link unit 20 includes a descriptor address register 25, a descriptor memory 26, a message address register 27, and a message memory 28. Registers 25 and 27 contain a single address each, while memories 26 and 28 are multi-shortword memories. The descriptor memory 26 is 4 words long, as the quantity of information which a descriptor has to contain requires 4 words to contain it; these words are all shortwords of 16 bits, the basic word length of the link unit 20.

The descriptor address register 25 contains the address (in main memory 10) of the descriptor in the descriptor memory 26, and the message address register 27 contains the address (in main memory 10) of the buffer associated with the descriptor. The descriptor address register 25 is initialized and updated as discussed above. Also, as noted above, the descriptors contain the addresses (in main memory 10) of the associated buffers. The descriptor memory 26 is therefore coupled to the message address register 27 by means of an address transfer circuit 29, so that the buffer address can be transferred from the descriptor to the address register. (As will be explained below, an address conversion is in fact involved).

The message memory 28 is also coupled to the communications device 21, and the operation of the link unit is controlled by a control unit 30.

The link unit 20 has an internal address bus 35, to which the address registers 25 and 27 are coupled. The main system address bus 12 is 32 bits wide, as are the address registers 25 and 27. This bus is 35 coupled to the system address bus 12 through an address processing circuit 36, which includes an address offset register 37 which is used to increase the address length of the link unit addresses to the address length of the system address bus 12. This address offset register 37 may be regarded as being initialized in a manner similar to the initialization of the descriptor address register 25.

It is necessary for the link unit to write the descriptor words individually into the main memory 10 (and to read them individually from that memory). The descriptor words are shortwords, 16 bits long, while the main memory width is 32 bits and only full longwords can be read from and written to it. The area in main memory 10 assigned to a descriptor must therefore be 4 longwords long, so that each of the 4 words (shortwords) of the descriptor can be written into the main memory individually without losing any of the other 3 descriptor words. Only the lower half of each of the 4 descriptor longwords is therefore significant. The descriptor memory 26 is therefore coupled by a bus 38 to the bottom 16 bits of the 32-bit wide main system data bus 11.

The descriptor address is defined by the contents of the descriptor address register 25. The address in this register is concatenated with the (high-order) offset in register 37, and incremented by 0, 1, 2, or 3 depending on which word of the descriptor is to be read or written (as determined by the control unit 30). The incrementing can be achieved (under the control of the control unit 30) either by constructing the register 25 as a counter or by coupling it to the address bus 35 via an incrementing circuit (not shown).

A message also consists essentially of shortwords, which are stored in the message memory 28 and pass between that and the communications device 21. These also have to be stored in the main memory 10. Unlike the descriptor shortwords, however, it is not essential for the message shortwords to be readable and writable individually.

The message memory 28 in the link unit 20 is coupled to the system data bus through a condec (concatenator/deconcatenator) unit 40, which includes 2 16-bit registers 41 and 42. These can be written to or read from the link message memory 28 individually, so that shortwords can pass individually between memory 28 and unit 40; they can also be written to or read from the system data bus 11 together, so that longwords can pass between memory 10 and unit 40.

The conversion of the message between longwords and pairs of shortwords can be also accomplished in other ways. It will of course be realised that if the Length of the message is an odd number of shortwords, then one of the longwords will be only half full—i.e. half of it will be meaningless (like the upper halves of the longwords in which the descriptor shortwords are stored in the main memory 10). The processor 15 will be informed of the length of the message by means of the corresponding descriptor block, so when the upper half of the last longword of the message is empty and meaningless, the processor will ignore it.

The address of a message buffer in the main memory 10 is 32 bits, and this address is obtained from the contents of the memory address register 27 by concatenating the offset in register 37 in the address processing circuit 36, as well as, the addresses of the descriptor words.

But the mapping between shortwords in the link unit 20 and longwords in the main memory 10 is different for descriptor words and message words, and the address processing circuit 36 therefore processes the descriptor and message word address conversions differently.

In the link unit 20, both the descriptor and message words are shortwords. When they are in main memory (i.e. being read from or written to main memory), these (short)words are identified by the link unit by means of their addresses. These addresses are those accessible to and manipulable by the link unit 20, i.e. the addresses in the registers 25 and 27. To avoid undue complexity, the link unit 20 is designed to treat these addresses equivalently. In particular, successive shortwords have successive addresses as far as the link unit 20 is concerned, whether they are descriptor or message words.

As discussed above, however, descriptor shortwords are mapped 1-to-1 to main memory long words, while message shortwords are mapped 2-to-1 to main memory longwords. A sequence of successive link unit shortword addresses must therefore map to a corresponding sequence of longword main memory addresses if the shortwords are descriptors, but must map 2-to-1 to a sequence half as long as main memory longword addresses.

To enable this to be achieved, the most significant bit of a link unit address is used to distinguish between descriptors and message words. This means that as far as the link unit 20 is concerned, it sees the main memory address space as having two halves, and the link unit has to be organized and arranged so that descriptors are always stored in one half of that address space and message words in the other half. (There is no significant difficulty in complying with this constraint).

The address processing circuit 36 includes a multiplexer 43 which converts a link unit address into a main memory address in the appropriate manner dependent on whether it is a descriptor address or a message word address. The address bits on the link unit address bus 35 are named $A_{23}$ (high-order) to $A_0$. The high-order bit $A_{23}$ is fed to the control input of the multiplexer. Bit $A_0$ is a byte select bit, which is not used in the present system. The remaining bits are $A_{22}$ to $A_1$, and these are fed to one input of the multiplexer with the high-order bit omitted and to the other input with the low-order bit omitted.

Specifically, the first "data" input (selected by a 0 control bit on $A_{23}$) to the multiplexer is fed with the address bits $A_{22}$ to $A_2$ and the second "data" input (selected by a 1 control bit) is fed with the address bits $A_{22}$ to $A_1$. Bit $A_{23}$ is '1' for a descriptor address and '0' for a message word address. Hence successive descriptor addresses in the link unit 20 are converted to successive addresses on the main system address bus and in the main memory. Successive message word addresses in the link unit 20, however, have their lowest order bit deleted in being passed to the main system address bus. They are therefore converted in pairs to successive main system addresses.

It will be realised that the top address bit $A_{23}$ acts solely to control the multiplexer. Thus although it separates the memory space seen by the link unit 20 into two halves, as discussed above, those two halves are superposed on each other (with a compression of one half by a factor of 2 relative to the other half) in the main memory 10.

If desired, the address bit $A_{23}$ may be fed to the control input of the multiplexer via a gate 39 which is enabled by a signal from the control unit 30. This allows the address shifting to be disabled if desired.

It will be realised that this results in only 21 or 22 bits being passed to the 32-bit system address bus 12. The remaining high-order system address bits can be set to any desired value by the offset register 37, which feeds the top 10 or 9 bits respectively of the system address bus.

The system design must take into account the mapping between link unit addresses and main memory addresses and the fact that the mappings for descriptors and message words are different.

As far as descriptors are concerned, these are accessed by both the processor 15 and the link unit 20. However, the descriptors are stored at locations which are known to both the processor 15 and the link unit 20, and each can therefore maintain its own record of their location. The mapping and conversion of the two forms of the descriptor addresses thus only needs to be considered on initialization.

The buffers are however identified primarily by addresses stored in the descriptors, and it is these stored addresses which are used by both the processor 15 and the link unit 20 to address the buffers. The addresses can be stored in the form of either main system addresses or link unit addresses, with the link unit 20 having to convert them in the former case and the processor 15 in the latter case. The form in which the addresses are stored will normally be chosen according to whichever conversion is more convenient. If the addresses are stored as main memory addresses, the link unit 20 will have to perform the conversion; this can conveniently be done by the address transfer circuit 29.

FIG. 2 shows a practical embodiment of the system. Parts which correspond broadly to parts of the FIG. 1 system are given corresponding references.

The FIG. 2 system includes a main system bus 50 coupled to a main system processor 15, to a main system memory 10' through main memory interface logic 13', and to a link control unit 20'. The main system bus 50 is a single 32-bit-wide bus on which data longwords and addresses are multiplexed.

In the link unit 20', there is a communications unit 51, coupled to address discrimination and manipulation logic 36' and to a data manipulation logic unit 52. The link unit 20' is coupled to the main bus 50 via a set of bus transceivers 55. An internal bus 56 couples the address discrimination and manipulation logic 36', the data manipulation logic 52, and the transceivers 55 together. A FIFO (first in first out) memory 53 for temporary storage of address and data words is also coupled to the bus 56. All these units are controlled by a control until 30'.

The communications unit 51 stores descriptors, message words, and addresses. This unit 51 is shortword based, and is coupled to the data manipulation logic 52 and the address discrimination and manipulation unit 30' by a 16 bit bus 57. It is also coupled to the address discrimination and manipulation unit 30' by an auxiliary 8-bit bus 58, so that it supplies a 24-bit address to that unit.

In the address discrimination and manipulation unit 30', the bottom bit ($A_o$) of the addresses is ignored, because that bit is a byte address or identifier within shortwords.

One of the functions of the FIFO memory 53 is to buffer information between the 16-bit shortword operations of the link unit 20' and the 32-bit longwords on the system bus 50. This memory 53, together with the data manipulation logic unit 52, thus perform the condec function,

What is claimed is:

1. A data processing system comprising:

a data processing unit;

a system data bus coupled to the data processing unit; said system data bus having a width being a longword which is a multiple of a shortword length;

a system address bus coupled to said data processing unit:

said data processing unit comprising:

a shortword memory means comprising a first storage location for storing descriptor shortwords and a second storage location for storing message shortwords;

means for passing shortwords between the first storage location of the shortword memory means and the system data bus individually without concatenating;

means for concatenating and deconcatenating shortwords passing between the second storage location of the shortword memory means and the system data bus to match the longword length and the shortword length, respectively;

internal address storage means, coupled to an internal address bus, including a first and second registers for storing addresses of shortwords in the first and second storage locations of said shortword memory means, respectively;

internal address processing means for passing addresses therefrom to said system address bus, the internal address processing means comprising:

a multiplexer with its two data inputs coupled to said internal address bus and fed from the internal address storage means with said shortword addresses, said multiplexer is controlled by a bit from the internal address storage means.

\* \* \* \* \*